United States Patent
Tokumasu et al.

(10) Patent No.: US 10,069,429 B2
(45) Date of Patent: Sep. 4, 2018

(54) PUSH-PULL TYPE ISOLATED DC/DC CONVERTER INCLUDING ZERO VOLTAGE SWITCHING

(71) Applicant: DENSO CORPORATION, Kariya, Aichi-pref. (JP)

(72) Inventors: Akira Tokumasu, Kariya (JP); Hiroshi Taki, Kariya (JP); Kazuhiro Shirakawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/365,554

(22) Filed: Nov. 30, 2016

(65) Prior Publication Data

US 2017/0155327 A1 Jun. 1, 2017

(30) Foreign Application Priority Data

Nov. 30, 2015 (JP) .................................. 2015-233946

(51) Int. Cl.
*H02M 3/337* (2006.01)
*H02M 3/335* (2006.01)
*H02M 1/00* (2006.01)

(52) U.S. Cl.
CPC ......... *H02M 3/3376* (2013.01); *H02M 3/337* (2013.01); *H02M 3/3372* (2013.01); *H02M 3/33584* (2013.01); *H02M 3/33592* (2013.01); *H02M 2001/0054* (2013.01); *Y02B 70/1491* (2013.01)

(58) Field of Classification Search
CPC .................................................. H02M 3/337
See application file for complete search history.

(56) References Cited

U.S. PATENT DOCUMENTS

| 5,331,533 A | * | 7/1994 | Smith | .................... | H02M 1/44 |
| | | | | | 363/131 |
| 2005/0024901 A1 | * | 2/2005 | Ying | ................. | H02M 3/33569 |
| | | | | | 363/24 |
| 2014/0334188 A1 | | 11/2014 | Jitaru et al. | | |
| 2015/0098250 A1 | | 4/2015 | Wu et al. | | |

FOREIGN PATENT DOCUMENTS

| JP | 2015-095935 A | 5/2015 |
|---|---|---|
| JP | 2016-220315 A | 12/2016 |
| JP | 2017-103872 A | 6/2017 |
| JP | 2017-189001 A | 10/2017 |
| WO | 2008/020629 A1 | 2/2008 |

* cited by examiner

*Primary Examiner* — Kyle J Moody
*Assistant Examiner* — Trinh Q Dang
(74) *Attorney, Agent, or Firm* — Oliff PLC

(57) ABSTRACT

In a push-pull type DC/DC converter capable of operating primary side switching elements alternately, a switching operation section turns on a primary side switching element having a high priority after a mode (d) as a normal state is transferred to a mode (d) as an inverse state during a circulation period when a load current is circulated into the secondary side rectifier elements when all of the primary side switching elements are turned off. To turn on the primary side switching element having a high priority after occurrence of the state transition to the inverse state can reduce a voltage immediately after supplying of electric power to the primary side switching elements with using exciting current and without adding any additional component.

8 Claims, 12 Drawing Sheets

MODE (a)

← LOAD CURRENT $i_L$
←--- EXCITING CURRENT $i_{Lm}$

MODE (b)

MODE (d)

MODE (e)

MODE (f)

PUSH-PULL TYPE ISOLATED DC/DC CONVERTER INCLUDING ZERO VOLTAGE SWITCHING

CROSS-REFERENCE TO RELATED APPLICATION

This application is related to and claims priority from Japanese Patent Application No. 2015-233946 filed on Nov. 30, 2015, the contents of which are hereby incorporated by reference.

BACKGROUND OF THE INVENTION

1. Field of the invention The present invention relates to push-pull type isolated DC/DC converters composed of a transformer, a plurality of primary and secondary switching elements and a power source, and the primary side switching elements are alternately turned on and off to perform a direct current power conversion for converting a direct current (DC) power of the power source.

2. Description of the Related Art

There has been known an electric power conversion device having at least a transformer, switching elements or diodes, and a power source. The switching elements are turned on and off to perform a direct current (DC) power conversion for converting a DC power of the power source. When a switching element in the conventional electric power conversion device is turned on before a drain-source voltage of the switching element is reduced to a predetermined voltage, a turn-on loss (or switching loss) occurs in the switching element. This turn-on loss is calculated by multiplying a current and a voltage.

For example, patent document 1, International publication No. WO 2008/020629, has disclosed a conventional push-pull type DC/DC converter. In the conventional push-pull type DC/DC converter, a controller controls an auxiliary switch to charge an external capacitor, or discharges from the external capacitor by using a leakage inductance at a primary side. This operation reduces a voltage of switching elements as a main switch. After the reduction of the voltage of the main switch to the predetermined voltage, the controller starts to turn on the switching elements.

The structure of the conventional push-pull type DC/DC converter disclosed in the patent document previously described requires the auxiliary switch so as to charge to and discharge from the external capacitor. This conventional structure needs to increase the total number of components forming the push-pull type DC/DC converter, and also to increase the overall size of the push-pull type DC/DC converter.

SUMMARY

It is therefore desired to provide a push-pull type DC/DC converter having at least a transformer, a plurality of primary side switching elements (or diodes) and a plurality of secondary side switching elements (or diodes), the push-pull type DC/DC converter being arranged between a direct current (DC) power source and an electrical load, and capable of reducing a turn-on loss of the primary side switching elements without using any auxiliary switch and increasing an overall size thereof.

An exemplary embodiment provides a push-pull type DC/DC converter to be arranged between a direct current (DC) power source and an electrical load. The push-pull type DC/DC converter performs a DC power conversion to convert a DC power of the DC power source.

The push-pull type DC/DC converter has at least a transformer, a plurality of primary side switching elements, a plurality of secondary side rectifier elements, a smoothing inductor, and a switching operation section. The transformer has a plurality of primary coils and a plurality of secondary coils. These primary coils and secondary coils form an excitation inductor of the transformer. The plurality of primary side switching elements alternately operate and being connected between the plurality of primary side coils and the power source. A flywheel diode is arranged parallel to each of the plurality of primary side switching elements. The plurality of secondary side rectifier elements are connected to the plurality of secondary side coils, and rectify a current flowing in the plurality of secondary side coils.

The smoothing inductor is connected between the plurality of secondary side rectifier elements and electrical load. The switching operation section controls the plurality of primary side switching elements, and further controls a plurality of secondary side switching elements. The plurality of secondary side switching elements correspond to the plurality of secondary side rectifier elements, respectively.

The switching operation section turns on one of the plurality of primary side switching elements having a high priority after a normal state is transferred to an inverse state. This normal state indicates a condition in which an absolute value of an element load current becomes not less than an absolute value of a converted exciting current ($iL_m$). The inverse state indicates a condition in which the absolute value of the element load current becomes less than the absolute value of the converted exciting current.

Technical terms are defined as follows, which are used during a circulation period of time in which a load current ($i_L$) flowing in an electrical load (Ld) is circulated into the plurality of secondary side rectifying elements when all of the plurality of primary side switching elements are turned off.

An element load current indicates a circulation current circulated into one of the plurality of secondary side switching elements through electrical load (Ld) and the smoothing inductor (7). A converted exciting current is a part of the exciting current ($i_{Lm}$), which has been converted in one of the plurality of secondary side rectifier elements, when the exciting current flows in the excitation inductor of the transformer (20).

A normal state indicates a condition in which an absolute value of the element load current becomes not less than an absolute value of the converted exciting current.

An inverse state indicates a condition in which the absolute value of the element load current becomes less than the absolute value of the converted exciting current.

The switching operation section turns on the primary side switching element having a priority after the normal state is transferred to the inverse state. The present invention notices a difference between the element load current and the converted exciting current. That is, the behavior of the push-pull type DC/DC converter according to the exemplary embodiments is controlled on the basis of the difference between the element load current and the converted exciting current.

When the exciting current, which flows in the secondary side, starts to also flow in the primary side, electric charge accumulated between the drain and source of the primary side switching element are discharged, and the drain-source voltage of the primary side switching element thereby reduces. When the primary side switching element is turned on after the state transition to the invert state from the normal state, it is possible to reliably reduce the voltage of the primary side switching element immediately after the initiation of electric power supply to the primary side switching element. It is possible for the push-pull type DC/DC converter according to the present invention to have an improved structure capable of reducing the turn-on loss of the switching elements forming the transformer with a simple structure and without adding any auxiliary switch used in the conventional technique previously described.

It is preferable for the switching operation section to turn on the primary side switching element during the inverse state of the push-pull type DC-DC converter. It is more preferable for the switching operation section to turn on the primary side switching element after the drain-source voltage of the primary side switching element reaches zero voltage. This makes it possible to realize zero-voltage switching operation, and to reliably reduce the turn-on loss of the primary side switching element.

It is possible for the switching operation section in the push-pull type DC-DC converter according to the present invention to predict a timing when the state transition to the inverse state occurs, or perform a feed-forward control so as to detect the correct timing when the state transition to the inverse state occurs.

In order to reliably detect the timing when the state transition to the inverse state occurs, it is more preferable for push-pull type DC-DC converter according to the present invention to further have a state judgment section. This state judgment section detects occurrence of the state transition to the inverse state from the normal state, and detects that the exciting current flowing in the secondary side returns to the primary side on the basis of one of a current which flows in each of the primary side and the secondary side, and a voltage of each of the primary side and the secondary side.

The switching operation section turns on the primary side switching element having a high priority during a predetermined period of time after detecting the state transition to the inverse state.

The state judgment section correctly detects occurrence of the state transition to the inverse state on the basis of the following conditions [1] to [4], i.e. when at least one of the following current detection conditions [1] and [2] and the voltage conditions [3] and [4] is satisfied.

[1] The secondary side current sensors 63, 64 detect that a current flowing in the secondary side rectifier elements becomes zero.
[2] The primary side current sensors 61, 62 and 60 detect a current which flows in the primary side switching elements, or detect the exciting current which flows in the primary side caused by the exciting current flowing in the secondary side on the basis of the current flowing between the power source and a primary-side center tap of the transformer.
[3] The primary side voltage sensors 65, 66 detect that the drain-source voltage of the primary side switching element reduces or increases during the period of time when all of the plurality of primary side switching elements are turned off.
[4] The secondary side voltage sensors 67, 68 detect that the voltage between both the terminals of the secondary side rectifier element increases during the period of time when all of the plurality of primary side switching elements are turned off.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
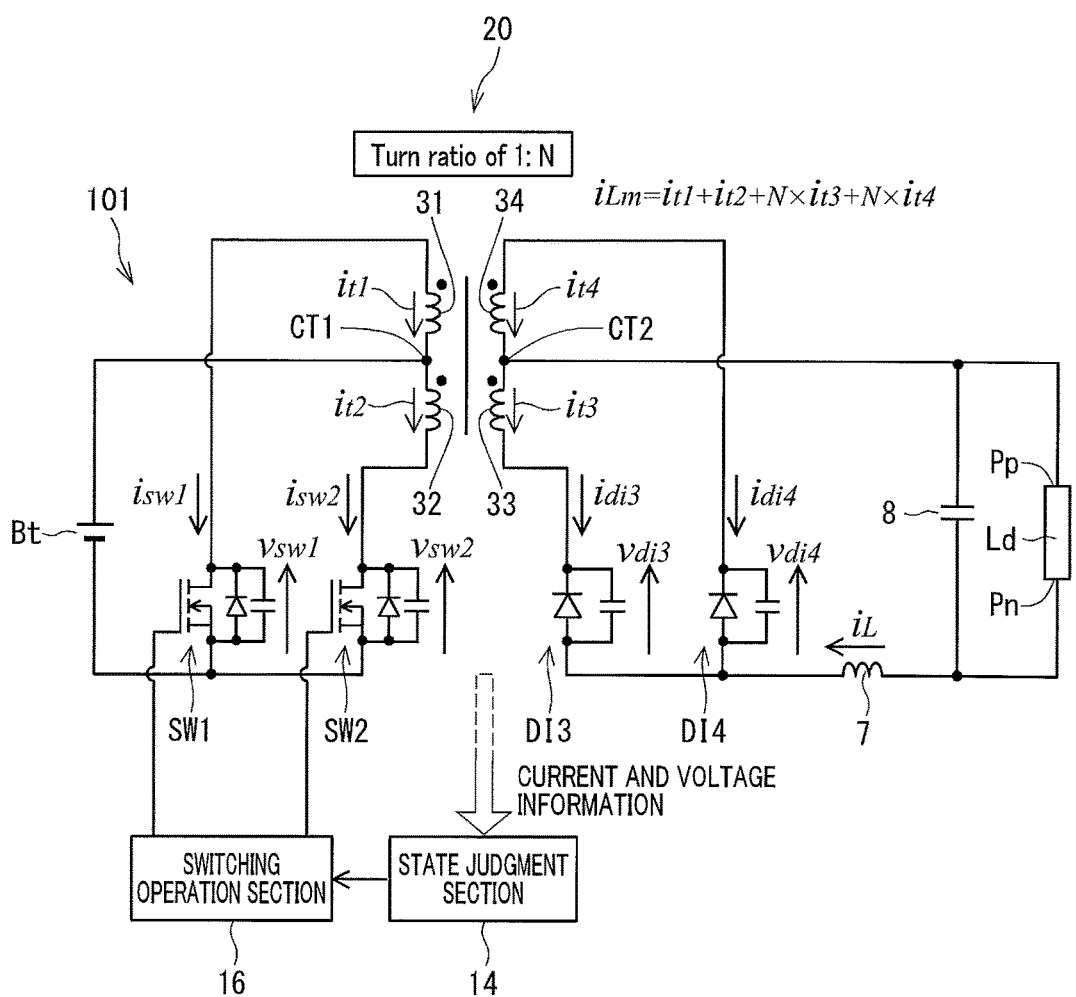
FIG. 1 is a view showing a structure of a push-pull type DC/DC converter according to exemplary embodiments of the present invention, in which a diode is used as a secondary side rectifier element.

Hereinafter, various embodiments of the present invention will be described with reference to the accompanying drawings. In the following description of the various embodiments, like reference characters or numerals designate like or equivalent component parts throughout the several diagrams.

Preferred Embodiments

A description will be given of a push-pull type DC/DC converter according to preferred embodiments with reference to FIG. 1 to FIG. 11.

Figure 2:
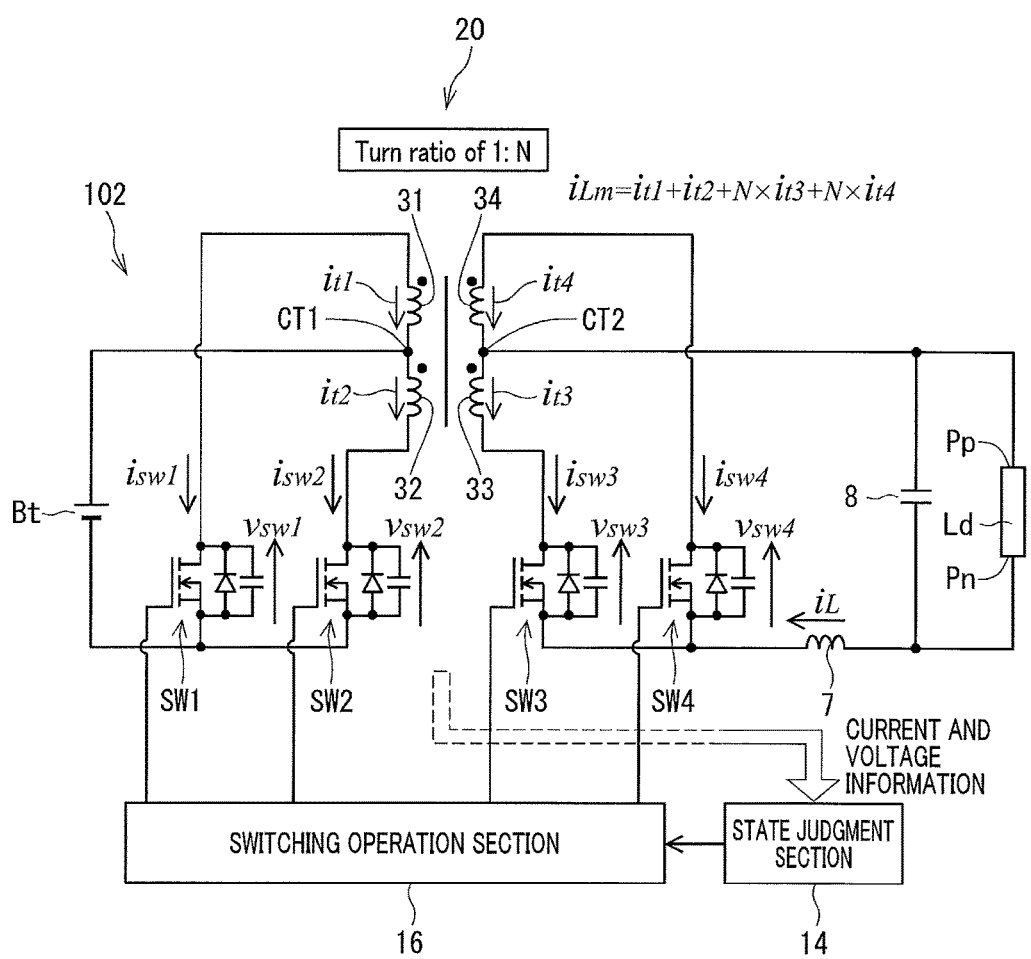
FIG. 2 is a view showing another structure of the push-pull type DC/DC converter according to the exemplary embodiments of the present invention, in which a switching element is used as the secondary side rectifier element.

FIG. 1 is a view showing a structure of the push-pull type DC/DC converter according to the exemplary embodiment in which a diode is used as a secondary side rectifier element. FIG. 2 is a view showing another structure of the push-pull type DC/DC converter according to the exemplary embodiment in which a switching element is used as the secondary side rectifier element.

The structure shown in FIG. 1 is different in structure of the plurality of secondary side rectifier elements from the structure shown in FIG. 2. That is, the push-pull type DC/DC converter shown in FIG. 1 uses a diode DI3 and a diode DI4 as the secondary side rectifier elements.

On the other hand, the push-pull type DC/DC converter shown in FIG. 2 uses a switching element SW3 and a switching element SW4 as the secondary side rectifier elements.

One of important matters according to the present invention is to have the detection structure capable of detecting a current or voltage in order to correctly and timely detect the state transition to the inverse state from the normal state during a minimum load current period. That is, the push-pull type DC/DC converter according to each of the exemplary embodiments, which will be explained later in detail, has a state judgment section capable of detecting an occurrence of the state transition to the inverse state from the normal state during the minimum load current period on the basis of a detected current or voltage. This minimum load current period will be explained later.

The structure and behavior of the state judgment section can be adopted to each of the push-pull type DC/DC converters having a different structure shown in FIG. 1 and FIG. 2.

A description will be given of the structure and behavior of the push-pull type DC/DC converter using the diodes DI3 and DI4, and the structure of the push-pull type DC/DC converter using the switching elements SW3 and SW4. After the explanation of the basic concept of the push-pull type DC/DC converter, a description will be given of the explanation of the structure and behavior of the push-pull type DC/DC converter according to first to fourth exemplary embodiments and various modifications in detail.

A description will be given of the structure and behavior of the push-pull type DC/DC converter using the diodes DI3 and DI4 shown in FIG. 1. The diodes DI3 and DI4 are used as the secondary side rectifier element.

As shown in FIG. 1, the push-pull type DC/DC converter 101 is arranged between a direct current (DC) power source Bt and an electrical load Ld. The push-pull type DC/DC converter 101 converts direct current (DC) power supplied from the DC power source Bt, and supplies the converted DC power to the electrical load Ld.

The push-pull type DC/DC converter 101 is composed of a transformer 20, a pair of the primary side switching elements SW1 and SW2, a pair of the secondary diodes DI3 and DI4, a smoothing inductor 7, etc. The transformer 20 is composed of a pair of primary side coils 31 and 32 and a pair of secondary side coils 33 and 34. The primary side coils 31 and 32 and the secondary side coils 33 and 34 form an excitation inductor.

The push-pull type DC/DC converter 101 further has a switching operation section 16 and the state judgment section 14. The switching operation section 16 controls each of the primary side switching elements SW1 and SW2.

The primary side coils and the secondary side coils in the transformer 20 have a turn ratio of 1:N, where N is a natural number. An exciting current $I_{Lm}$ flows in the excitation inductor. The exciting current $I_{Lm}$ is equal to a total sum of currents $I_{t1}$, $I_{t2}$, $N \times I_{t3}$ and $N \times I_{t4}$ which flow in the primary coils 31 and 32 and the secondary coils 34 and 35, respectively.

The push-pull type DC/DC converter 101 according to each of the first to fourth exemplary embodiments has the turn ratio of 1:1.

One terminals of the primary coil 31 and 32 are connected together at a primary-side center tap CT1. This primary-side center tap CT1 is connected to a positive electrode of the DC power source Bt. The other terminals of the primary coils 31 and 32 are connected to a negative electrode of the DC power source Bt through the primary side switching elements 31 and 32, respectively.

One terminals of the secondary coil 33 and 34 are connected together at a secondary-side center tap CT2. This secondary-side center tap CT2 is connected to one terminal of the electrical load Ld. The other terminal of the secondary coil 33 is connected to a cathode of the diode DI3. The other terminal of the secondary coil 34 is connected to a cathode of the diode DI4.

The smoothing inductor 7 is connected between an anode of each of the diodes DI3 and DI4 and the other terminal of the electrical load Ld. When receiving electric power, The smoothing inductor 7 accumulates magnetic energy when receiving electric power. A load current $i_L$ flows in the electrical load Ld and the smoothing inductor 7. A positive direction or a forward direction of the load current $i_L$ is a direction from the electrical load Ld to the diodes DI3 and Di4 through the smoothing inductor 7. As shown in FIG. 1 and FIG. 2, a secondary side smoothing capacitor 8 is connected parallel to the electrical load Ld.

The primary side switching elements SW1 and SW2 are connected between the primary coils 31 and 32 and the negative electrode of the DC power source Bt. Further, a flywheel diode is connected parallel to each of the primary side switching elements SW1 and SW2. The primary side switching elements SW1 and SW2 operate alternately supply a positive/negative voltage to the primary side coils 31 and 32, respectively.

The push-pull type DC/DC converter according to the exemplary embodiment uses a MOS FET (Metal Oxide Semiconductor Field Effect Transistor) having a body diode as each of the primary side switching elements SW1 and SW2. This body diode can be considered as the flywheel diode. A capacitance generated between the drain and source of each of the primary side switching elements SW1 and SW2 can be designated by using reference character Vsw1, Vsw2, respectively. This capacitance Vsw1, Vsw2 is not a physical capacitor, a synthesis capacitance of the transistor, diode and a capacitor arranged between the transistor and the diode.

The drain of the primary side switching element SW1 is connected to the primary coil 31. The drain of the primary side switching element SW2 is connected to the primary coil 32. The source of each of the primary side switching elements SW1 and SW2 is connected to the negative electrode of the DC power source Bt. The switching operation section 16 generates and transmits a gate signal to the gate of each of the primary side switching elements SW1 and SW2. It is acceptable for each of the exemplary embodiments to use a transistor such as IGBT (Insulated Gate Bipolar Transistor) as the switching element. A base, collector, emitter of a transistor such as an IGBT corresponds to the gate, drain and source of the switching element, respectively.

A description will now be given of a structure of the push-pull type DC/DC converter 102 having the switching elements SW3 and SW4 as the secondary side rectifier elements with reference to FIG. 2.

Further, a difference in structure and behavior between the push-pull type DC/DC converter 102 shown in FIG. 2 and the push-pull type DC/DC converter 101 shown in FIG. 1 will be explained later. In the structure of the push-pull type DC/DC converter 102, the secondary side switching elements SW3 and SW4 rectify a current flowing in the secondary coils 33 and 34. A flywheel diode is connected parallel to each of the secondary side switching elements SW3 and SW4.

Similar to the primary side switching elements SW1 and SW2, the structure of the push-pull type DC/DC converter 102 uses MOS FETs (Metal Oxide Semiconductor Field Effect Transistor) having a body diode as the secondary side switching elements SW3 and SW4.

The drain of the secondary side switching element SW3 is connected to the secondary coil 33. The drain of the secondary side switching element SW4 is connected to the secondary coil 34. The source of each of the secondary side switching elements SW3 and SW4 is connected to the smoothing inductor 7. The switching operation section 16 generates and transmits a gate signal to the gate of each of the secondary side switching elements SW3 and SW4. That is, the switching operation section 16 further controls the behavior of each of the secondary side switching elements SW3 and SW4 in addition to the primary side switching elements SW1 and SW2. Specifically, the switching operation section 16 performs a synchronous rectification process to reduce a conduction loss caused during a conduction state of each of the secondary side switching elements SW3 and SW4. The switching operation section 16 turns on each of the secondary side switching elements SW3 and SW4 during the synchronous rectification process.

Similar to the primary side switching elements SW1 and SW2, it is acceptable for the push-pull type DC/DC converter according to the exemplary embodiments to use a transistor such as an IGBT as the secondary side switching elements SW3 and SW4. In this case, a base, collector, emitter of a transistor such as the IGBT corresponds to the gate, drain and source of the switching element, respectively.

A description will be given of the behavior of each of the push-pull type DC/DC converters 101, 102 with reference to FIG. 3.

Figure 3:
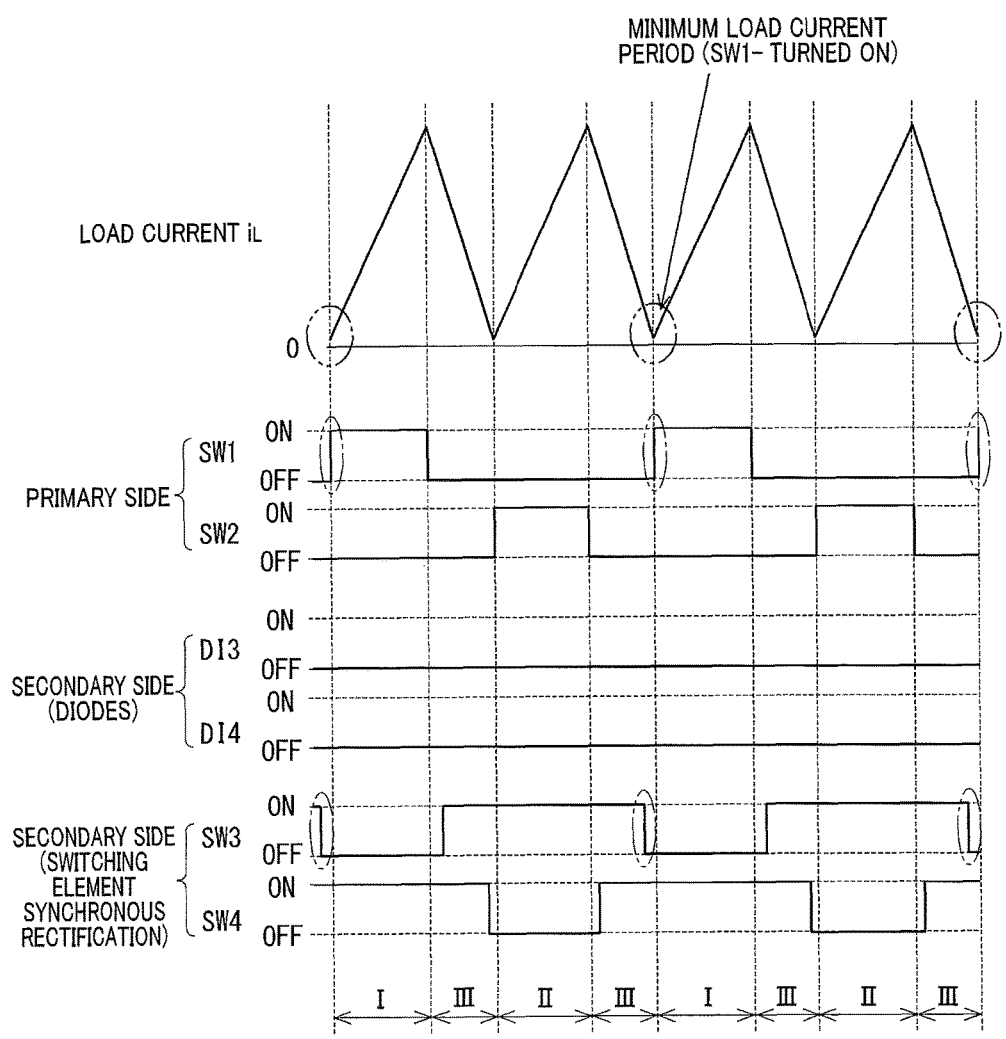
FIG. 3 is a timing chart showing behavior of the push-pull type DC/DC converter according to the exemplary embodiments of the present invention.

FIG. 3 is a timing chart showing the behavior of the push-pull type DC/DC converter according to the exemplary embodiment. As shown in FIG. 3, the following three periods, i.e. first to third periods are determined on the basis of the turned-on/off states of the primary side switching elements SW1 and SW2.

In the first period I, the primary side switching element SW1 is turned on, and the primary side switching element SW2 is turned off.

In the second period II, the primary side switching element SW1 is turned off, and the primary side switching element SW2 is turned on.

In the third period III, both the primary side switching elements SW1 and SW2 are turned off. The state of the primary side switching elements SW1 and SW2 in each of the push-pull type DC/DC converters 101 and 102 is transferred for in order of the first period I, the third period III, the second period II, the third period III, the first period I, . . . so that each of the primary side switching elements SW1 and SW2 is turned on/off.

In particular, during the third period III, magnetic energy accumulated in the smoothing inductor 7 reduces, and a load current $i_L$ also reduces. On the other hand, during the first period I and the second period II, magnetic energy is accumulated in the smoothing inductor 7, and the load current $i_L$ increases.

In the structure of performing the synchronous rectification process using the secondary side switching elements SW3 and SW4, the secondary side switching element SW3 is turned on after the first period I has been transferred to the third period III. Further, the secondary side switching element SW3 is turned off before a time when the period III is transferred to the first period I after the elapse of the second period II.

On the other hand, the secondary side switching element SW4 is turned on after the second period II has been transferred to the third period III. Further, the secondary side switching element SW4 is turned off before a time when the third period III is transferred to the second period II after the elapse of the first period I.

In order to prevent occurrence of a short circuit, a dead time is maintained by slightly shifting the switching timing of the secondary side switching elements SW3 and SW4 from the switching timing of the primary side switching elements SW1 and SW2.

A valley period when the load current $i_L$ starts to increase from a previous decrease, for example, when the third period III is transferred to the first period I or the second period II, will be called to as the minimum load current period (see FIG. 3).

Figure 12:
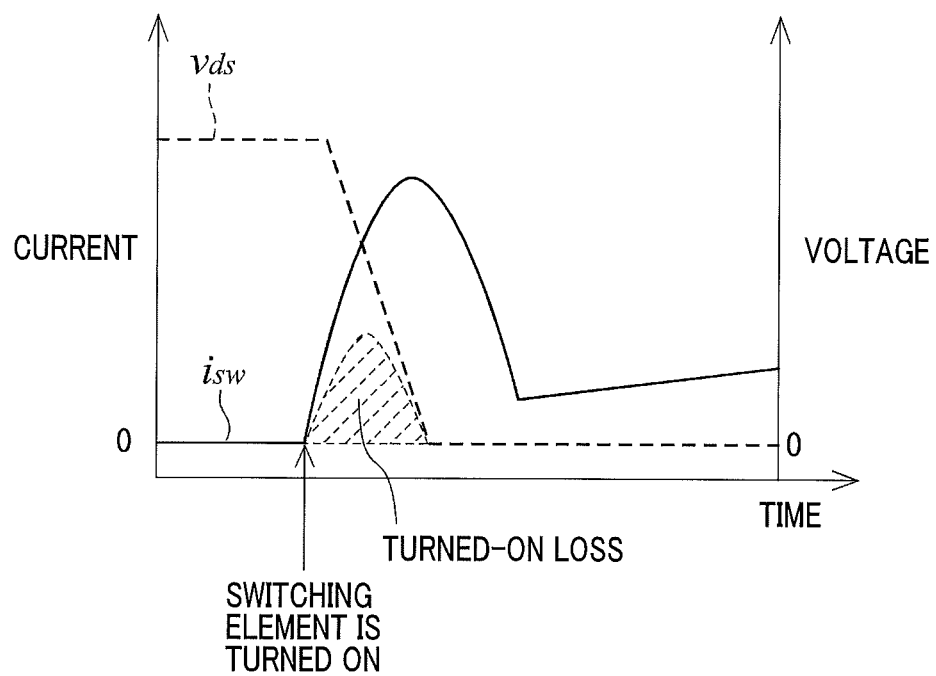
FIG. 12 is a view explaining a turn-on loss of a switching element in the push-pull type DC/DC converter.

FIG. 12 is a view explaining a turn-on loss (or switching loss) of the switching element in the push-pull type DC/DC converter. The minimum value of the load current $i_L$ in the minimum load current period is determined by a timing when each of the primary side switching elements SW1 and SW2 is turned on. For example, as shown in FIG. 12, a current $i_{sw}$ starts to flow when the switching element is turned on during a period in which a drain-source voltage $v_{ds}$ of the switching element is high, this often generates a turn-on loss, a magnitude thereof is calculated by a products of a current and voltage.

One of the important features of the push-pull type DC/DC converter according to the first to fourth exemplary embodiments is to reduce the turn-on loss, as previously described, by using a simple structure which uses an exciting current during the minimum load current period.

A description will now be given of a typical example in which the primary switching element SW1 is turned on when the third period is transferred to the first period I designated by a circle shown in FIG. 3.

On the other hand, it is necessary to turn on the primary side switching element SW1 after the secondary side switching element SW3 has been turned off when the synchronous rectification is performed by using the secondary side switching elements SW3 and SW4.

A current change and voltage change of the secondary side switching element SW3 and the primary side switching element SW1 will be explained.

It is also possible to understand the behavior of the secondary side switching element SW4 and the primary side switching element SW2 when the third period III is transferred to the second period II on the basis of the following explanation while considering a sign which indicates a flow direction of the current.

A description will be given of the minimum load current period shown in FIG. 3 with reference to FIG. 4, FIG. 5A, FIG. 5B, FIG. 6A, FIG. 6B and FIG. 6C.

Figure 4:
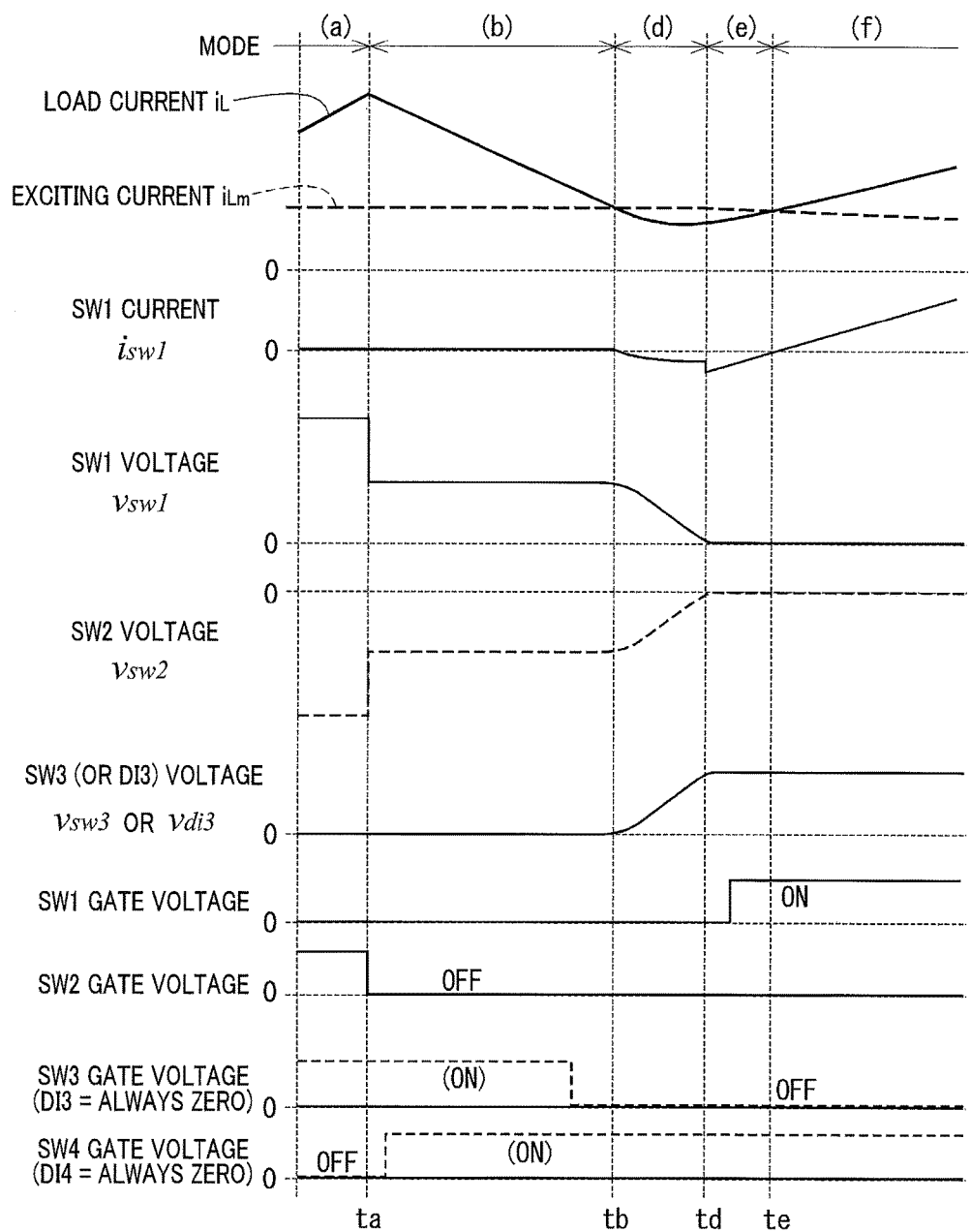
FIG. 4 is a timing chart showing a current change and voltage change in the push-pull type DC/DC converter shown in FIG. 1 and FIG. 2 when primary side switching elements SW1 and SW2 are turned on (during a minimum load current period)

FIG. 4 is a timing chart showing a current change and voltage change in the push-pull type DC/DC converter when the primary side switching elements SW1 and SW2 are turned on (during the minimum load current period).

Figure 5A:
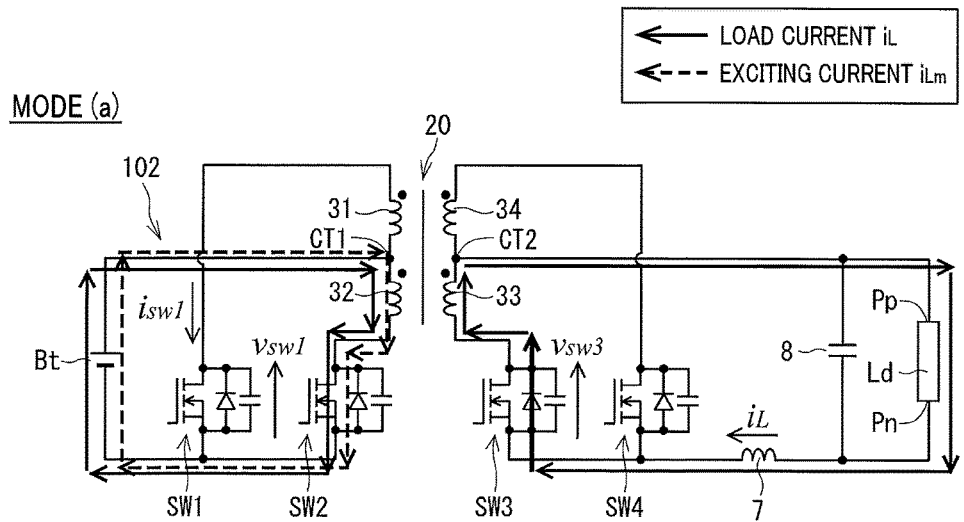
FIG. 5A is a view showing a current path at a mode (a) (see FIG. 4) in the push-pull type DC/DC converter shown in FIG. 1 and FIG. 2.
Figure 5B:
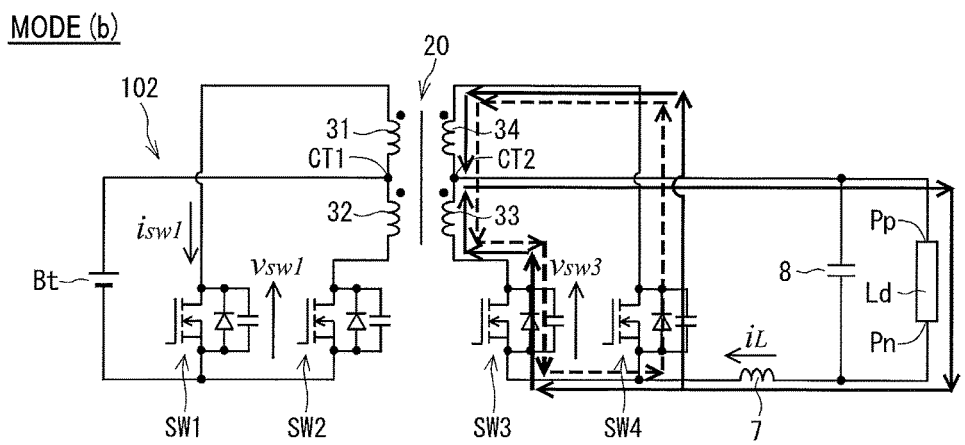
FIG. 5B is a view showing a current path at a mode (b) (see FIG. 4) in the push-pull type DC/DC converter shown in FIG. 1 and FIG. 2.
Figure 6A:
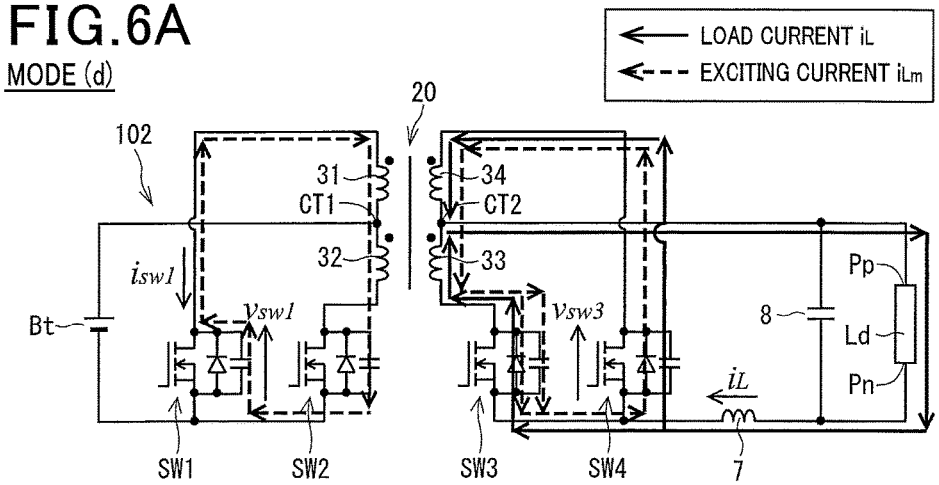
FIG. 6A is a view showing a current path at a mode (d) (see FIG. 4) in the push-pull type DC/DC converter shown in FIG. 1 and FIG. 2.
Figure 6B:
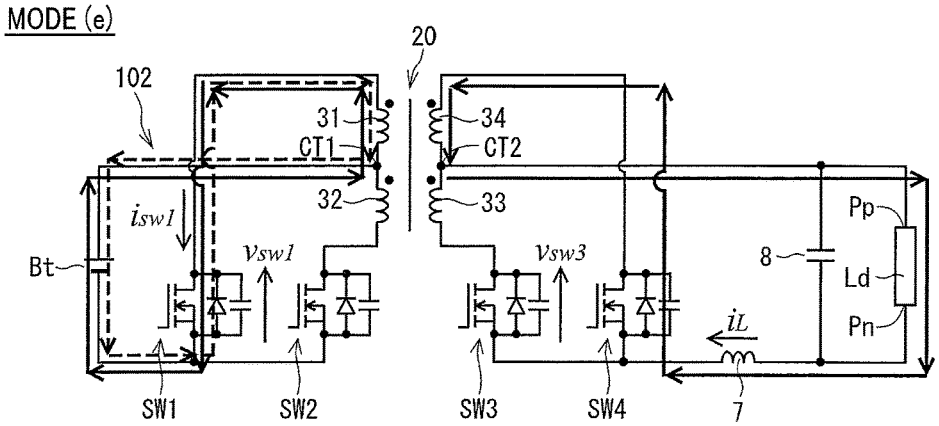
FIG. 6B is a view showing a current path at a mode (e) (see FIG. 4) in the push-pull type DC/DC converter shown in FIG. 1 and FIG. 2.
Figure 6C:
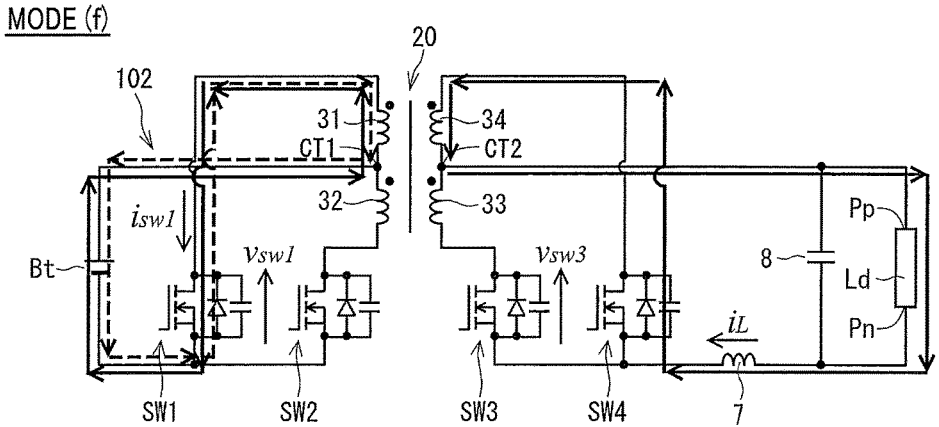
FIG. 6C is a view showing a current path at a mode (f) (see FIG. 4) in the push-pull type DC/DC converter shown in FIG. 1 and FIG. 2.

FIG. 5A and FIG. 5B are views showing a current path at modes (a) and (b), respectively (see FIG. 4), in the push-pull type DC/DC converter shown in FIG. 1 and FIG. 2. FIG. 6A to FIG. 6B and FIG. 6C are views showing a current path at modes (d), (e) and (f), respectively (see FIG. 4), in the push-pull type DC/DC converter shown in FIG. 1 and FIG. 2.

In particular, FIG. 5A and FIG. 5B and FIG. 6A to FIG. 6C show the case in which the secondary side rectifier elements are composed of the switching elements SW3 and SW4.

FIG. 4 shows variations of a load current iL, an exciting current $i_{Lm}$, a current $i_{SW1}$ of the primary side switching element SW1 (hereinafter, the SW1 current $i_{SW1}$), a voltage $v_{SW1}$ of the primary side switching element SW1 (hereinafter, the SW1 voltage $v_{SW1}$), a voltage $v_{SW2}$ of the primary side switching element SW2 (hereinafter, the SW2 current $i_{SW2}$), a voltage $V_{SW3}$ of the secondary side switching element SW3 (hereinafter, the SW3 voltage $v_{SW3}$), a gate voltage of the primary switching element SW1, a gate voltage of the primary switching element SW2, a gate voltage of the secondary switching element SW3, and a gate voltage of the secondary switching element SW4 (in order from the top to the bottom in FIG. 4).

When the diodes DI3 and DI4 are used as the secondary side rectifier elements, the gate voltage of each of the diode DI3 and DI4 is always zero. Further, when the synchronous rectification process is performed by using the secondary side switching elements SW3 and SW4, the gate voltage of the secondary side switching elements SW3 and SW4 is designated by dashed lines shown in FIG. 4.

An element load current and a converted exciting current to be used in the following explanation are defined as follows.

During a circulation period of time in which the load current flowing in the electrical load Ld is circulated to the plurality of secondary side rectifying elements SW3, SW4 when all of the plurality of primary side switching elements are turned off, the element load current indicates a current circulated into one of the plurality of secondary side switching elements through the electrical load Ld and the smoothing inductor 7.

Further, the converted exciting current is a part of the exciting current $i_{Lm}$, which has been converted by each of the plurality of secondary side rectifier elements, when the exciting current $i_{Lm}$ flows in the excitation inductor of the transformer (20) and does not vary during the third period III (see FIG. 3), and the exciting current $i_{Lm}$ is accumulated in the excitation inductor of the transformer 20 during the first period and the second period II (see FIG. 3).

A normal state indicates a condition in which an absolute value of the element load current becomes not less than an absolute value of the converted exciting current. An inverse state indicates a condition in which the absolute value of the element load current becomes less than the absolute value of the converted exciting current.

An inverse state indicates a condition in which the absolute value of the element load current becomes less than the absolute value of the converted exciting current.

The switching operation section turns on the primary side switching element having a priority after the normal state is transferred to the inverse state. The present invention notices a difference between the element load current and the converted exciting current. That is, the behavior of the push-pull type DC/DC converter according to the exemplary embodiments is controlled on the basis of the difference between the element load current and the converted exciting current.

The basic structure of the push-pull type DC/DC converter according to the exemplary embodiments has the two secondary side rectifier elements having the same electrical specification. Further, the primary side coils and the secondary side coils in the transformer 20 have the turn ratio of 1:1. That is, the element load current is designated by $i_L/2$, and the converted exciting current is designated by $i_{Lm}/2$.

That is, when the converted exciting current is compared with the element load current, because a half value of the converted exciting current is compared with a half value of the element load current, it is possible to have the same comparison result by comparing the load current $i_L$ with the exciting current $i_{Lm}$. Accordingly, FIG. 4 shows a difference between the converted exciting current and the element load current by using the load current $i_L$ and the exciting current $i_{Lm}$.

The exemplary embodiment use the five modes (a), (b), (d), (e) and (f) shown in FIG. 5A, and FIG. 5B, FIG. 6A to FIG. 6C in which the load current $i_L$ is designated by the solid lines and the exciting current $i_{Lm}$ is designated by the dashed lines. No mode (c) is present.

A sign of each current and voltage is defined as follow:

A positive direction (or a forward direction) of the load current $i_L$ is from the secondary-side center tap CT2 of the transformer 20 to the secondary side switching elements SW3 and SW4 through the smoothing inductor 7.

A positive direction (or a forward direction) of the exciting current $i_{Lm}$ is shown by using the dashed lines with an arrow shown in each of FIG. 5A, and FIG. 5B, FIG. 6A to FIG. 6C.

A positive direction (or a forward direction) of the SW1 current $i_{sw1}$ is from the drain to the source of the primary side switching element SW1, as indicated by the direction toward the bottom in each of FIG. 5A, FIG. 5B and FIG. 6A to FIG. 6C. Further, a negative direction of the SW1 current $i_{sw1}$ is indicated by the direction toward the top in each of FIG. 5A, FIG. 5B and FIG. 6A to FIG. 6C.

Each of the SW1 voltage $v_{sw1}$ of the primary side switching element SW1, the SW3 voltage $v_{sw3}$ of the secondary side switching element SW3, etc. means a drain-source voltage of each switching element thereof. As designated by the arrow in each of FIG. 5A, and FIG. 5B, FIG. 6A to FIG. 6C, a positive voltage of each of the SW1 voltage $v_{sw1}$ of the primary side switching element SW1, the SW3 voltage $v_{sw3}$, of the secondary side switching element SW3, etc. indicates the drain voltage thereof on the basis of the source voltage thereof. There is a complementary relationship between the SW2 voltage $v_{sw2}$ of the primary side switching element SW2 and the SW1 voltage $v_{sw1}$ of the primary side switching element SW1. The SW2 voltage $v_{sw2}$ of the primary side switching element SW2 is designated by a dashed line.

A description will now be given of each of the modes (a), (b), (d), (e) and (f) shown in FIG. 5A, FIG. 5B and FIG. 6A to FIG. 6C.

In the mode (a), the primary side switching element SW2 is turned on and the primary side switching element SW1 is turned off. During this mode (a), the push-pull DC/DC converter controls under the normal mode and the load current $i_L$ gradually increases when the load current $i_L$ is not less than the exciting current $i_{Lm}$.

When the synchronous rectification process is performed in the secondary side switching elements, the secondary side switching element SW3 is turned on as shown by the dashed lines.

In the mode (a), the load current $i_L$ and the exciting current $i_{Lm}$ flow into the primary side through the primary side switching element SW2. Further, the load current $i_L$ flows in the secondary side through the secondary side switching element SW3 and the diode DI3.

When the primary side switching element SW2 is turned off at a load current maximum timing ta, the mode (a) is transferred to the mode (b). In the mode (b), the load current $i_L$ starts to reduce. During the mode (b), both the primary side switching elements SW1 and SW2 are turned off, and the load current $i_L$ is gradually reduced while maintaining the normal state in which the load current $i_L$ is not less than the exciting current $i_{Lm}$.

In the structure for performing the synchronous rectification process by using the secondary side switching elements SW3 and SW4, the secondary side switching element SW4 is turned on when the mode (a) is transferred to the mode (b). The secondary side switching element SW3 is turned off before an inverse start timing tb.

During the mode (b), both the exciting current $i_{Lm}$ and the exciting current $i_{Lm}$ are circulated through the secondary side switching elements SW3 and SW4 or the secondary side diodes DI3 and DI4, are not transferred into and flow in the primary side.

After the inverse start timing tb at which the load current $i_L$ becomes equal to the exciting current $i_{Lm}$, the mode (b) is transferred to the mode (d) as the inverse state.

During the state transition from the mode (b) to the mode (d), both the primary side switching elements SW1 and SW2 maintain the turned off state.

When the synchronous rectification process is performed in the secondary side switching elements, the secondary side switching element SW3 has been turned off during the state transition from the mode (b) to the mode (d).

A description will be given of the explanation for a diode nonconductive current i, a primary-side transformation current $I_P$, a secondary side remain current $i_S$ with reference to FIG. 7A and FIG. 7B.

Figure 7A:
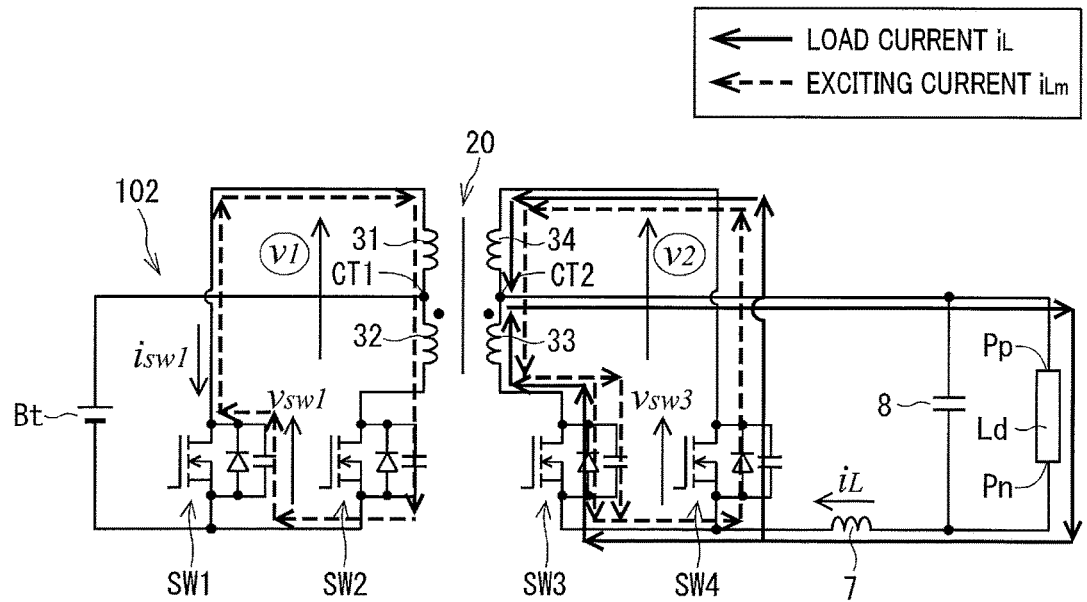
FIG. 7A is a view showing the current path in the mode (d) shown in FIG. 6A with a voltage reference character v1 of the primary side transformer voltage and a reference character v2 of the secondary side transformer voltage.

FIG. 7A is a view showing the current path in the mode (d) shown in FIG. 6A in which voltage reference characters v1, v2 are added. FIG. 7B is a view showing a circuit model showing an equivalent circuit of the current path in the mode (d) shown in FIG. 7A, i.e. shown in FIG. 6A.

As shown in FIG. 7A, a reference character v1 of the primary side transformer voltage and a reference character v2 of the secondary side transformer voltage are added in a current path during the mode (d) shown in FIG. 6A.

The primary side transformer voltage v1 indicates a voltage potential at one terminal, not at the primary-side center tap of the primary coil 31 on the basis of the other voltage potential of the terminal, not at the primary-side center tap side of the primary coil 32.

The secondary side transformer voltage v2 indicates a voltage potential at one terminal, not at the secondary-side center tap side of the secondary coil 32 on the basis of the voltage potential of the terminal, not at the secondary-side center tap side of the secondary coil 33.

It is acceptable to replace the secondary side switching elements SW3 and SW4 with the diodes DI3 and DI4, respectively. It is also necessary to have the structure in which the primary side switching elements SW1 and SW2 are arranged parallel to each other and have the same electrical specification, and the secondary side switching elements SW3 and SW4 or the secondary side diodes DI3 and DI4 are arranged parallel to each other and have the same electrical specification.

Figure 7B:
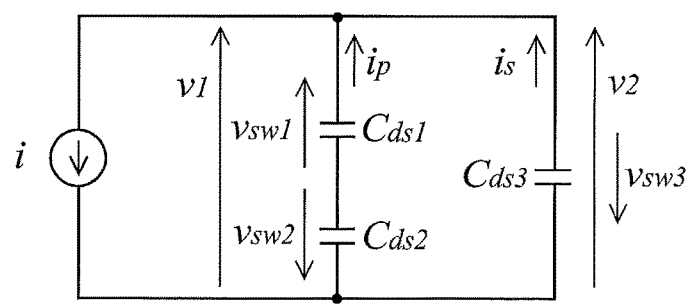
FIG. 7B is a view showing a circuit model as an equivalent circuit of the current path in the mode (d) shown in FIG. 7A, i.e. shown in FIG. 6A.

FIG. 7B shows the equivalent circuit of the mode (d) shown in FIG. 6A. In FIG. 7B, reference character i designates the diode nonconductive current i, reference character $i_p$ designates the primary-side transformation current, and reference character $i_s$ indicates the secondary side remain current. The diode nonconductive current i is obtained by subtracting the converted exciting current ($i_{Lm}/2$) from the element load current ($i_L/2$).

Reference characters $C_{ds1}$, $C_{ds2}$ and $C_{ds3}$ shown in FIG. 7B indicate a capacitance between the drain and source of each of the switching elements, respectively.

When a secondary-side load current $i_L$ becomes less than the exciting current $i_{Lm}$, this exciting current $i_{Lm}$, cannot flow through the body diode of the secondary side switching element SW3. The diode nonconductive current i is obtained by subtracting the converted exciting current ($i_{Lm}/2$) from the element load current ($i_L/2$). The primary-side transformation current $i_p$ is obtained by multiplying the diode nonconductive current i with an impedance ratio between the primary-side switching element path and the secondary-side switching element path. Accordingly, the primary-side transformation current $i_p$ starts to flow in the primary side caused by the above phenomenon.

Because the primary-side transformation current $i_p$ flows in the direction to charge the capacitor arranged parallel to the secondary side switching element SW2 by the electric charge in the capacitor arranged parallel to the primary side switching element SW1, the SW1 current $i_{SW1}$ becomes a negative value.

When the primary-side transformation current $i_p$ flows, the SW1 current $i_{SW1}$ is gradually reduced, and on the other hand, the SW2 current $i_{SW2}$ gradually increases. Accordingly, the voltage reduction of the SW1 voltage $v_{SW1}$ starts at the inverse start timing tb.

Further, when the secondary side remain current $i_s$ is obtained by subtracting the primary-side transformation current $i_p$ from the diode nonconductive current i, because the capacitor arranged parallel to the secondary side switching element SW3 having the SW3 voltage is charged by the secondary side remain current $i_s$, the SW3 voltage $v_{SW3}$ rises.

The SW1 voltage $v_{sw1}$ is reduced to zero at a zero voltage reached timing td (see FIG. 4).

In the mode (e) as the inverse state shown in FIG. 6B after the SW1 voltage $v_{sw1}$ has reached to zero, because the voltage of each of the primary side switching elements SW1, SW2 and the secondary side switching element SW3 reaches its steady voltage during the period I (see FIG. 3), no charging/discharging current flows in the capacitor which is arranged parallel to each of the primary side switching elements SW1, SW2 and the secondary side switching element SW3. The overall exciting current $i_{Lm}$, which corresponds to a difference to the load current $i_L$, flows in the primary side, and is regenerated in the DC power source Bt.

Because the SW1 voltage $v_{sw1}$ becomes zero regardless of the turned on/off state of the primary side switching element SW1, a reverse voltage to the voltage during the period II is applied to the coil 31 in the transformer 20. For this reason, the SW1 voltage $v_{sw1}$ increases in the positive direction (or the forward direction).

The state judgment section 14 detects the state transition from the normal state to the inverse state during the load minimum period, i.e. the occurrence of the state transition from the mode (b) to the mode (d) and mode (e) on the basis of the information regarding a current or voltage of the primary side or the secondary side in the transformer 20. The state judgment section 14 transmits the detection result to the switching operation section 16.

After the detection of the state judgment section 14, the switching operation section 16 turns on the primary side switching element SW1 having the priority to be turned on during a predetermined period of time. This predetermined period of time will be explained in detail.

It is acceptable for the switching operation section 16 to turn on the primary side switching element SW1 during the mode (d) or the mode (e). It is also preferable for the switching operation section 16 to turn on the primary side switching element SW1 during the mode (e). This operation makes it possible to provide the zero voltage switching operation under the zero voltage of the SW1 voltage $v_{sw1}$.

When the SW1 current $i_{sw1}$ increases forwardly during the mode (e), and the current time has passed a normal state return timing to (see FIG. 4) at which the SW1 current $i_{sw1}$ becomes equal to the current flowing in the DC power source Bt at the primary side, the mode (e) is transferred to the mode (f).

In the mode (f), the primary side switching element SW1 is turned on, and the SW1 current $i_{sw1}$ flows forwardly. After this, the SW1 current $i_{sw1}$ having a positive value gradually increases (see FIG. 4).

As previously described in detail, the switching operation section 16 turns on the primary side switching element having the switching operation section 16 having a high priority at the timing determined based on the judgment result of the state judgment section 14 regarding the state transition to the inverse state. This control operation makes it possible to determine the switching timing to reduce the turn-on loss of the switching elements by using a simple structure.

Next, a description will be given of the exemplary embodiments regarding a specific structure for detecting a current or voltage with reference to FIG. 8 to FIG. 11. The state judgment section 14 detects a correct timing to switch from the normal mode to the inverse mode on the basis of the detected current or voltage.

FIG. 8 to FIG. 11 show the push-pull type DC/DC converter 102 having the switching elements to be used as the secondary side rectifier elements.

First Exemplary Embodiment

A description will be given of the structure of the push-pull type DC/DC converter 102 having the state detection section 14 according to the first exemplary embodiment with reference to FIG. 8.

Figure 8:
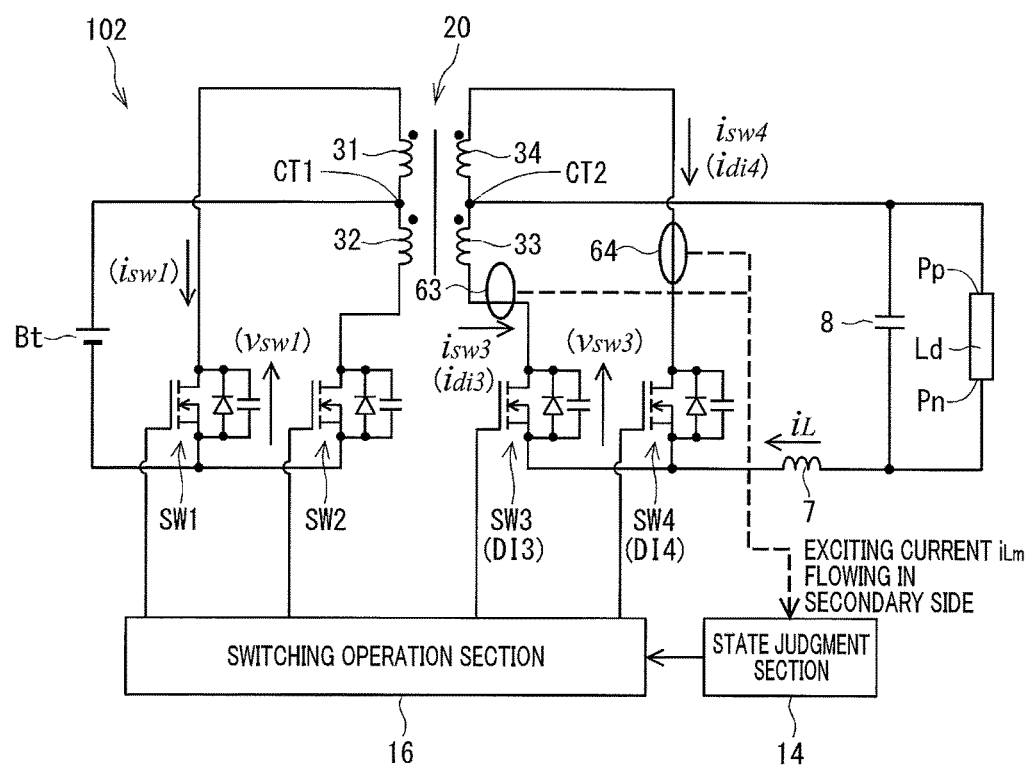
FIG. 8 is a schematic view showing a structure of the push-pull type DC/DC converter to detect a state transition according to a first exemplary embodiment of the present invention.

FIG. 8 is a schematic view showing a structure of the push-pull type DC/DC converter 102 to detect the state transition according to the first exemplary embodiment. In the structure of the push-pull type DC/DC converter 102 shown in FIG. 8, secondary side current sensors 63 and 64 are installed to a current path composed of the secondary side rectifier elements. The secondary side current sensors 63 and 64 detect a current $i_{sw3}$ which flows in the secondary side switching element SW3 and a current $i_{sw4}$ which flows in the secondary side switching element SW4, respectively.

In the structure of the push-pull type DC/DC converter having the diodes DI3 and DI4 as the secondary side rectifier elements, the secondary side current sensors 63 and 64 detect a current $i_{di3}$ and a current $i_{di4}$, respectively. It is also possible to replace the current $i_{sw3}$ and the current $i_{sw4}$ with the current $i_{di3}$ and the current $i_{di4}$, respectively, according to the structure of the push-pull type DC/DC converter.

When the mode (b) is transferred to the mode (d) as the inverse state shown in FIG. 6A, the exciting current $i_{Lm}$ starts to flow in the primary side caused by the exciting current $i_{Lm}$ which flows in the secondary side, and the SW1 current isw1 starts to flow in the negative direction of the primary side switching element SW1. Further, when the mode (d) is transferred to the mode (e), the exciting current $i_{Lm}$ which flows in the secondary side, becomes zero. The secondary side current sensor 63 detects that the current $i_{sw3}$, which flows in the secondary side switching element SW3, becomes zero. Similarly, the secondary side current sensor 64 detects that the current $i_{sw4}$, which flows in the secondary side switching element SW4, becomes zero when the period III is transferred to the period II shown in FIG. 3.

The state judgment section 14 detects and recognizes the push-pull type DC/DC converter enters in the inverse state when the secondary side current sensor 63 detects that the current $i_{sw3}$, which flows in the secondary side switching element SW3 (or the diode DI3), becomes zero, and the secondary side current sensor 64 detects that the current $i_{sw4}$, which flows in the secondary side switching element SW4 (or the diode DI4), becomes zero.

After the detection of the state judgment section 14, the switching operation section 16 turns on the primary side switching element SW1 or SW2 during the predetermined period of time.

A description will now be given of the turned-on operation of the primary side switching element SW1.

In the structure of the push-pull type DC/DC converter according to the first exemplary embodiment previously described, the state judgment section 14 detects the state transition to enter the inverse state at the timing when the mode (d) is transferred to the mode (e). At this timing when the mode (d) is transferred to the mode (e), the SW1 voltage $v_{sw1}$ has reached zero. Accordingly, it is possible to perform correctly the zero voltage switching operation by turning on the primary side switching element SW1 immediately after the state judgment section 14 judges the state transition to enter the inverse state.

Further, it is possible to reduce the turn-on loss of the primary side switching element SW1 immediately after the SW1 voltage $v_{sw1}$ is reduced in the mode (d) as the inverse state when compared with a case in which the switching elements are turned on during the mode (b) as the normal state of the push-pull type DC/DC converter.

It is accordingly possible for the DC converter according to each of the first to fourth exemplary embodiments to reduce the turn-on loss of each of the primary side switching elements SW1 and SW2 with a simple structure using the transfer of the exciting current $i_{Lm}$ from the secondary side to the primary side without using the auxiliary switch which is used in the push-pull type converter disclosed in the patent document 1 previously explained.

Second Exemplary Embodiment

A description will be given of the structure of the push-pull type DC/DC converter 102 according to the second exemplary embodiment with reference to FIG. 9.

Figure 9:
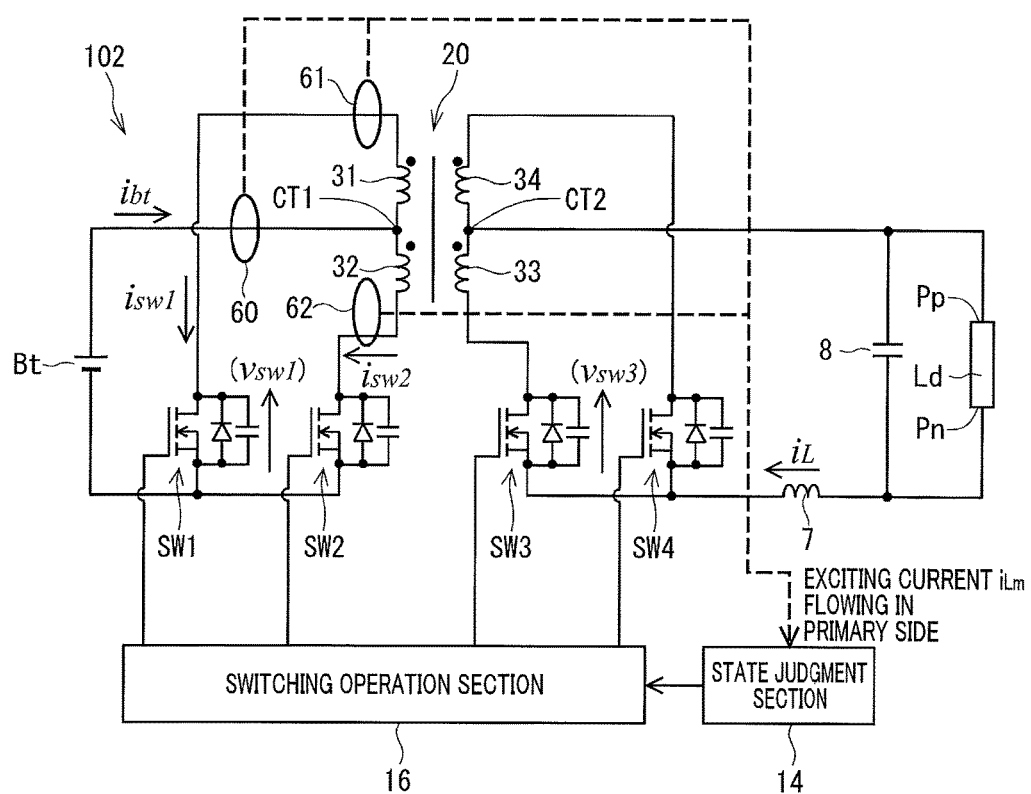
FIG. 9 is a schematic view showing a structure of the push-pull type DC/DC converter to detect a state transition according to a second exemplary embodiment of the present invention.

FIG. 9 is a schematic view showing a structure of the push-pull type DC/DC converter 102 to detect the state transition according to the second exemplary embodiment. In the structure of the push-pull type DC/DC converter 102 shown in FIG. 9, primary side current sensors 60, 61 and 62 are installed to the primary side current path. The primary side current sensors 61 and 62 detect a current $i_{sw1}$ which flows in the primary side switching element SW1 and a current $i_{sw2}$ which flows in the primary side switching element SW2, respectively.

The primary side current sensor 60 detects a current $i_{bt}$ which flows through the primary-side center tap CT1 between the DC power source Bt and the transformer 20. It is sufficient to have one of the primary side current sensor 60 and the pair of the primary side current sensors 61 and 62.

When the state transition to the mode (d) from the mode (b) occurs, as shown in FIG. 6A, the exciting current $i_{Lm}$ in the secondary side is transferred into the primary side, and the SW1 current $i_{sw1}$ starts to flow toward a negative direction in the primary side switching element SW1. The primary side current sensor 61 detects the SW1 current $i_{sw1}$ generated by the transformation of the exciting current $i_{Lm}$ during both the mode (d) and mode (e).

Similarly, when the period III is transferred to the period II shown in FIG. 3, the primary side current sensor 62 detects the SW2 current $i_{sw2}$ generated by the transformation of the exciting current $i_{Lm}$ during both the mode (d) and mode (e). Further, the current sensor 60 detects the exciting current $i_{Lm}$ which is transferred to the primary side and regenerated in the DC power source Bt.

The state judgment section 14 detects and recognizes the state transition to enter the inverse state when the primary side current sensors 61 and 62 and the primary side current sensor 60 detects the exciting current $i_{Lm}$ which has been transferred from the secondary side to the primary side. The switching operation section 16 turns on the primary side switching element SW1 or SW2 during the predetermined period of time after the detection of the state transition to enter the inverse state by the state judgment section 14.

A description will now be given of the turned-on operation of the primary side switching element SW1.

It is possible to detect the state transition to enter the inverse state on the basis of the timing when the mode (b) is transferred to the mode (d) by using the primary sider current sensors 61 and 62.

When the state transition to enter the inverse state is detected on the basis of the timing when the mode (b) is transferred to the mode (d), it is possible to reduce the turn-on loss because the SW1 voltage $v_{sw1}$ is smaller than that when the primary side switching element SW1 is turned on during the mode (b).

It is preferable to store, into a memory section (not shown) in advance, a delay time (or a reduction time), during which the SW1 voltage $v_{sw1}$ can be adequately reduced, obtained by an experiment or a simulation, and to turn on the primary side switching element SW1 after the elapse of the delay time counted from the timing when the mode (b) is transferred to the mode (d).

It is also acceptable to detect a value of the SW1 voltage $v_{sw1}$ as a judgment threshold value when the mode (d) is transferred to the mode (e), and to detect the occurrence of the state transition to enter the inverse state at the timing when the detection value of the SW1 voltage $v_{sw1}$ detected by the current sensor 61 reaches the judgment threshold value.

This operation previously described makes it possible to perform the zero voltage switching operation in which the primary side switching element SW1 is turned on at the timing when the mode (d) is transferred to the mode (e) after the SW1 voltage $v_{sw1}$ is reduced to zero. It is possible to greatly reduce the turn-on loss of the switching elements in the transformer 20.

In a case in which the state transition to enter the inverse state is detected at the timing when the mode (d) is transferred to the mode (e) by using the current sensor 60, it is possible to perform the zero voltage switching operation immediately after the state transition to enter the inverse state is detected, similar to the case of the first exemplary embodiment.

Third Exemplary Embodiment

A description will be given of the structure of the push-pull type DC/DC converter 102 according to the third exemplary embodiment with reference to FIG. 10.

Figure 10:
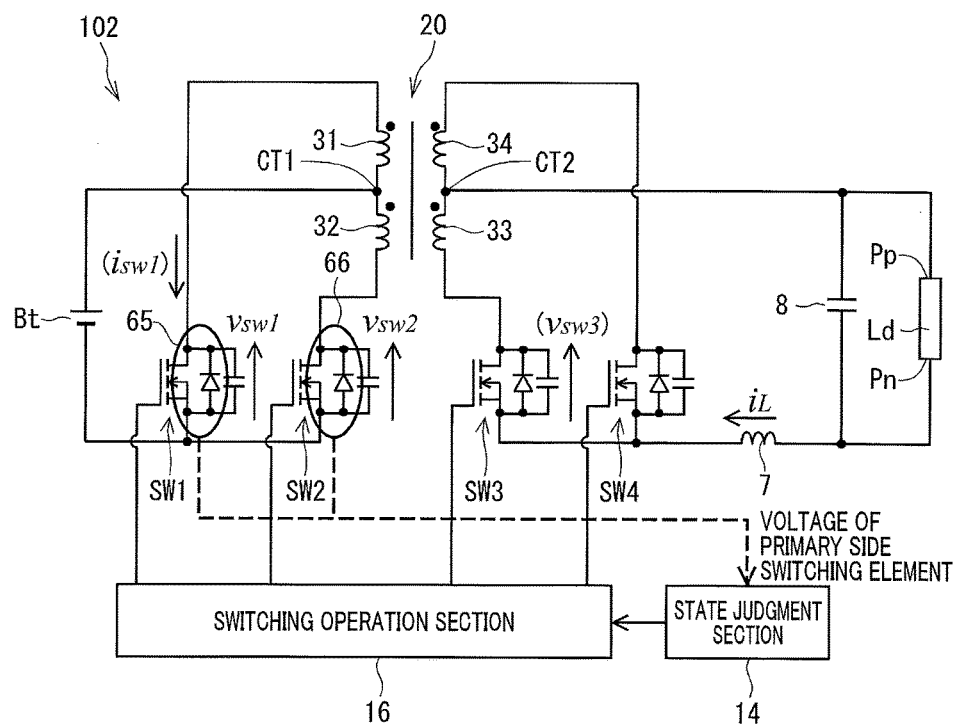
FIG. 10 is a schematic view showing a structure of the push-pull type DC/DC converter to detect a state transition according to a third exemplary embodiment of the present invention.

FIG. 10 is a schematic view showing a structure of the push-pull type DC/DC converter 102 to detect occurrence of the state transition according to the third exemplary embodiment.

In the structure of the push-pull type DC/DC converter 102 shown in FIG. 10, primary side voltage sensors 65 and 66 are installed, which are capable of detecting a drain-source voltage $v_{sw1}$ of the primary side switching element SW1 and a drain-source voltage $V_{sw2}$ of the primary side switching element SW2, respectively.

It is acceptable to use various types of sensors and circuits, as these primary side voltage sensors 65 and 66, capable of detecting these voltages $v_{sw1}$ and $V_{sw2}$. For example, it is possible to use a detection circuit using dividing resistors instead of individual voltage detection devices. Further, it is sufficient to use at least one of the primary side voltage sensors 65 and 66.

When the mode (b) is transferred to the mode (d) shown in FIG. 6A, both the primary side switching elements SW1 and SW2 are turned off. After the state transition to enter the mode (d), the exciting current $i_{Lm}$ flows in the primary side, the drain-source voltage $v_{sw1}$ of the primary side switching element SW1 starts to reduce, and on the other hand, the drain-source voltage $V_{sw2}$ of the primary side switching element SW2 starts to increase. When the state transition to enter the mode (e) occurs, both the SW1 voltage $v_{sw1}$ and the SW2 voltage $v_{sw2}$ become a constant value.

At this timing, the primary side voltage sensor 65 detects the SW1 voltage $v_{sw1}$ which gradually reduces. On the other hand, the primary side voltage sensor 66 detects the SW2 voltage $v_{sw2}$ which gradually increases.

During the transition period from the period III to the period II shown in FIG. 3, the primary side voltage sensor 65 detects the SW1 voltage $v_{sw1}$ which gradually increases. On the other hand, the primary side voltage sensor 66 detects the SW2 voltage $v_{sw2}$ which gradually reduces.

The state judgment section 14 detects the state transition to enter the inverse state when the primary side voltage sensors 65 and 66 detect the increasing or decreasing in voltage of the primary side switching elements SW1 and SW2 caused by the exciting current $i_{Lm}$ transferred to the primary side during the mode (d). The switching operation section 16 turns on the primary side switching element SW1 or SW2 during the predetermined period of time after the detection of the state transition to enter the inverse state by the state judgment section 14. The third exemplary embodiment uses the same turning-on operation of the second exemplary embodiment previously described.

Fourth Exemplary Embodiment

A description will be given of the structure of the push-pull type DC/DC converter 102 according to the fourth exemplary embodiment with reference to FIG. 11.

Figure 11:
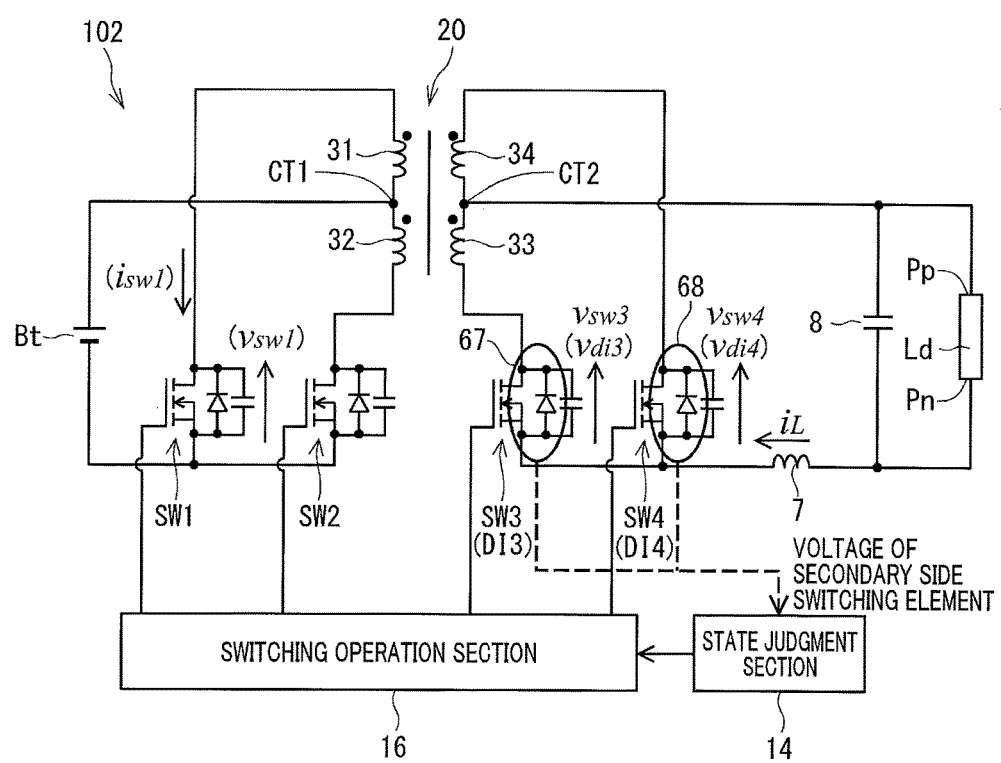
FIG. 11 is a schematic view showing a structure of the push-pull type DC/DC converter to detect a state transition according to a fourth exemplary embodiment of the present invention.

FIG. 11 is a schematic view showing a structure of the push-pull type DC/DC converter 102 to detect the state transition according to the fourth exemplary embodiment. In the structure of the push-pull type DC/DC converter 102 shown in FIG. 11, secondary side voltage sensors 67 and 68 are installed, which are capable of detecting a drain-source voltage $v_{sw3}$ of the secondary side switching element SW3 and a drain-source voltage $v_{sw4}$ of the secondary side switching element SW4, respectively.

By the way, in a case in which the diodes DI3 and DI4 are used as the secondary side rectifier elements, the secondary side voltage sensors 67 and 68 detect a voltage $v_{di3}$ of the diode DI3 and a voltage $v_{di4}$ of the diode DI4, respectively.

In the following explanation, it is possible to replace the SW3 voltage $v_{sw3}$ and the SW4 voltage $v_{sw4}$ can be replaced with the DI3 voltage $v_{di3}$ and the DI4 voltage $v_{di4}$, respectively. The both end terminal voltage of the secondary side rectifier element includes the drain-source voltage of the switching element. It is possible to use, as the voltage sensor, a detection circuit using dividing resistors instead of individual voltage detection devices. Further, it is sufficient to use at least one of the primary side voltage sensors 65 and 66.

When the mode (b) is transferred to the mode (d) as the inverse state shown in FIG. 6B, both the primary side switching elements SW1 and SW2 are turned off. After the state transition to enter the mode (d), the exciting current $i_{Lm}$ flows in the primary side, the drain-source voltage $v_{sw1}$ of the primary side switching element SW1 starts to reduce, and on the other hand, the drain-source voltage $v_{sw3}$ of the secondary side switching element SW3 starts to increase. When the state transition to enter the mode (e) occurs, the SW3 voltage $v_{sw3}$ becomes a constant value as the increased value. At this timing, the secondary side voltage sensor 67 detects the SW3 voltage $v_{sw3}$ which gradually increases. Similarly, during the state transition from the period III to the period II shown in FIG. 3, the secondary side voltage sensor 68 detects the SW4 voltage $v_{sw4}$ which gradually increases.

The state judgment section 14 detects the state transition to enter the inverse state when the secondary side voltage sensors 67 and 68 detect the increasing in voltage of the secondary side switching elements SW3 and SW4 or the secondary side diodes DI3 and DI4 caused by the exciting current $i_{Lm}$ transferred to the primary side during the mode (d). The switching operation section 16 turns on the primary side switching element SW1 or SW2 during the predetermined period of time after the detection of the state transition to enter the inverse state by the state judgment section 14. The fourth exemplary embodiment uses the same turning-on operation of the second exemplary embodiment previously described.

Other Modifications

The concept of the present invention is not limited by the structure and behavior of the push-pull type DC/DC converter according to each of the first to fourth exemplary embodiments previously described. It is possible for the present invention to have the following modification.

As previously described, the switching operation section 16 reliably detects occurrence of the state transition to the inverse state from the normal state on the basis of the judgment result of the state judgment section 14, and then turns on the primary side switching element SW1 or SW2.

However, the concept of the present invention is not limited by this. For example, it is not always necessary for the push-pull type DC/DC converter according to the present invention to have the state judgment section 14. Instead of using the state judgment section 14, the switching operation section 16 may predict a timing when the state transition to the inverse state occurs, or the switching operation section 16 may perform a feed forward control to detect the timing when the state transition to the inverse state occurs, and turns on the primary side switching element SW1 or SW2 during the inverse state or after the inverse state.

Further, in the structure of the push-pull type DC/DC converter according to the first to fourth exemplary embodiments previously described, the two rectifier elements are arranged parallel to each other, and the turn ratio of the primary side and the secondary side of the transformer 20 is 1:1. In this structure, when the overall exciting current $i_{Lm}$ is 1, the equivalent exciting current, which flows in each of the secondary side rectifier element, becomes a half of the overall exciting current $i_{Lm}$.

On the other hand, when the two rectifier elements are arranged parallel to each other, and the turn ratio of the primary side and the secondary side of the transformer 20 is 1:N, the equivalent exciting current, which flows in each of the secondary side rectifier element, becomes 1/(2N). In general, when M rectifier elements are arranged parallel to each other, and the turn ratio of the primary side and the secondary side of the transformer 20 is 1:N, the equivalent exciting current, which flows in each of the secondary side rectifier element, becomes 1/(M×N).

In the timing chart shown in FIG. 4, the positive direction (forward direction) and the negative direction haven been determined in order to directly compare the load current $i_L$ and the exciting current $i_{Lm}$ without reversing the sign of them. In particular, the normal state and the inverse state are detected on the basis of a result of comparing an absolute value of the element load current with an absolute value of the equivalent exciting current.

It is acceptable to use various kinds of the power source and load in the push-pull type DC/DC converter, and to change the range of the input voltage $v_{in}$, the output voltage $v_{out}$.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A push-pull type DC/DC converter, arranged between a power source and an electrical load, capable of converting a direct current power of the power source, the push-pull type DC/DC converter comprising:
   a transformer comprising: a plurality of primary coils and a plurality of secondary coils forming an excitation inductor;
   a plurality of primary side switching elements alternately operating and connected between the plurality of primary side coils and the power source, a flywheel diode being arranged parallel to each of the plurality of primary side switching elements;
   a plurality of secondary side rectifier elements connected to the plurality of secondary side coils, and capable of rectifying a current flowing in the plurality of secondary side coils;
   a smoothing inductor connected between the plurality of secondary side rectifier elements and the electrical load; and
   a switching operation section capable of operating the plurality of primary side switching elements, and further operating a plurality of secondary side switching elements as the plurality of secondary side rectifier elements, wherein the switching operation section turns on one of the plurality of primary side switching elements having a high priority during an inverse state after a drain-source voltage of the primary side switching element having the high priority reduces and reaches zero voltage, where the normal state indicates a condition in which an absolute value of an element load current becomes not less than an absolute value of a converted exciting current, and the inverse state indicates a condition in which the absolute value of the element load current becomes less than the absolute value of the converted exciting current, wherein the element load current and the converted exciting current are defined so that during a circulation period of time in which a load current, which flows in electrical load, is circulated into the plurality of secondary side rectifying elements when all of the plurality of primary side switching elements are turned off, the element load current indicates a current circulated into one of the plurality of secondary side switching elements through electrical load and the smoothing inductor, and the converted exciting current is a part of the exciting current, which has been converted by each of the plurality of secondary side rectifier elements, when the exciting current flows in the excitation inductor of the transformer.

2. The push-pull type DC/DC converter according to claim 1, further comprising a state judgment section capable of detecting an occurrence of the state transition to the inverse state from the normal state, and detecting that the exciting current which is flowing in the secondary side, starts to flow in the primary side on the basis of one of a current flowing in each of the primary side and the secondary side, and the voltage of each of the primary side and the secondary side.

3. The push-pull type DC/DC converter according to claim 1, wherein each of the plurality of secondary side rectifier elements is a diode.

4. The push-pull type DC/DC converter according to claim 2, further comprising at least a secondary side current sensor arranged at the secondary side capable of detecting a current flowing in one of the plurality of secondary side switching elements, and the state judgment section detects an occurrence of the state transition to the inverse state when the secondary side current sensor detects that a current flowing in the secondary side switching element becomes zero.

5. The push-pull type DC/DC converter according to claim 2, further comprising a primary side current sensor arranged at the primary side capable of detecting one of a current flowing in the primary side switching element and a current flowing between the power source and a primary-side center tap of the transformer, and the state judgment section detects the state transition to the inverse state when the primary side current sensor detects that the exciting current which flows in the secondary side starts to flow in the primary side.

6. The push-pull type DC/DC converter according to claim 2, further comprising a primary side voltage sensor arranged at the primary side capable of detecting a drain-source voltage of one of the primary side switching element, and the state judgment section detects an occurrence of the state transition to the inverse state when the primary side voltage sensor detects that the drain-source voltage of the primary side switching element reduces or increases.

7. The push-pull type DC/DC converter according to claim 2, further comprising a secondary side voltage sensor arranged at the secondary side capable of detecting a voltage between both terminals of the secondary side rectifier element, and the state judgment section detects an occurrence of the state transition to the inverse state when the secondary side voltage sensor detects that the voltage between both terminals of the secondary side rectifier element increases when the plurality of primary side switching elements are turned off.

8. A push-pull type DC/DC converter, arranged between a power source and an electrical load, capable of converting a direct current power of the power source, the push-pull type DC/DC converter comprising:

a transformer comprising: a plurality of primary coils and a plurality of secondary coils forming an excitation inductor;

a plurality of primary side switching elements alternately operating and connected between the plurality of primary side coils and the power source, a flywheel diode being arranged parallel to each of the plurality of primary side switching elements;

a plurality of secondary side rectifier elements connected to the plurality of secondary side coils, and capable of rectifying a current flowing in the plurality of secondary side coils;

a smoothing inductor connected between the plurality of seconds side rectifier elements and the electrical load; and a switching operation section capable of operating the plurality of primary side switching elements, and further operating a plurality of secondary side switching elements as the plurality of secondary side rectifier elements, wherein the switching operation section turns on one of the plurality of primary side switching elements having a high priority after a state transition from a normal state to an inverse state occurs, where the normal state indicates a condition in which an absolute value of an element load current becomes not less than an absolute value of a converted exciting current, and the inverse state indicates a condition in which the absolute value of the element load current becomes less than the absolute value of the converted exciting current, wherein the element load current and the converted exciting current are defined so that during a circulation period of time in which a load current, which flows in electrical load, is circulated into the plurality of secondary side rectifying elements when all of the plurality of primary side switching elements are turned off, the element load current indicates a current circulated into one of the plurality of secondary side switching elements through electrical load and the smoothing inductor, and the converted exciting current is a part of the exciting current, which has been converted by each of the plurality of secondary side rectifier elements, when the exciting current flows in. the excitation inductor of the transformer, wherein the plurality of secondary side rectifier elements are the plurality of secondary side switching elements, wherein a flywheel diode is arranged parallel to each of the plurality of secondary side switching elements, and the plurality of secondary side switching elements are transferred from a turned-on state to a turned-off state before the state transition to the inverse state from the normal state occurs.

* * * * *